US010754572B2

(12) United States Patent
Kumar et al.

(10) Patent No.: US 10,754,572 B2

(45) Date of Patent: Aug. 25, 2020

(54) MIGRATING CONTROL OF A MULTI-PATH LOGICAL DEVICE FROM A CURRENT MPIO DRIVER TO A TARGET MPIO DRIVER

(71) Applicant: EMC IP Holding Company LLC, Hopkinton, MA (US)

(72) Inventors: Kundan Kumar, Bangalore (IN); Shubham Sharma, Bangalore (IN); Kurumurthy Gokam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 16/155,491

(22) Filed: Oct. 9, 2018

(65) Prior Publication Data

US 2020/0110552 A1 Apr. 9, 2020

(51) Int. Cl.
*G06F 3/06* (2006.01)
*G06F 16/21* (2019.01)
*H04L 29/08* (2006.01)

(52) U.S. Cl.
CPC .......... *G06F 3/0647* (2013.01); *G06F 3/0611* (2013.01); *G06F 3/0629* (2013.01); *G06F 16/214* (2019.01); *H04L 67/1097* (2013.01)

(58) Field of Classification Search
None
See application file for complete search history.

(56) References Cited

U.S. PATENT DOCUMENTS 6,567,397 B1 5/2003 Campana et al.
6,687,746 B1 2/2004 Shuster et al.
6,697,875 B1 2/2004 Wilson
7,275,103 B1 9/2007 Thrasher et al.
7,454,437 B1 11/2008 Lavallee et al.
(Continued)

FOREIGN PATENT DOCUMENTS

CN 103677927 B 2/2017
EP 1117028 A2 7/2001
(Continued)

OTHER PUBLICATIONS

EMC, "EMC PowerPath and PowerPath/VE Family for Windows," Installation and Administration Guide, Oct. 2018, 102 pages.
(Continued)

*Primary Examiner* — Craig C Dorais
(74) *Attorney, Agent, or Firm* — Ryan, Mason & Lewis, LLP

(57) ABSTRACT

An apparatus in one embodiment comprises a host device that includes a set of input-output (IO) queues and a current multi-path input-output (MPIO) driver configured to select IO operations from the set of IO queues for delivery to the storage system. The current MPIO driver is configured to group a plurality of paths from the host device to a logical unit number of the storage system into a multi-path logical device. The host device is configured to install a target MPIO driver and to migrate control of the multi-path logical device to the target MPIO driver from the current MPIO driver where the migration comprises transferring IO entry points of the multi-path logical device from the current MPIO driver to the target MPIO driver. The host device is configured to deliver IO operations selected by the target MPIO driver to the storage system using the multi-path logical device.

20 Claims, 5 Drawing Sheets

500 HOST DEVICE INSTALLS TARGET MPIO DRIVER
502 EXISTING MULTI-PATH LOGICAL DEVICE TO BE MIGRATED TO CONTROL OF THE TARGET MPIO DRIVER?
NO → 504 END
YES
506 OBTAIN UNIQUE ID OF EXISTING MULTI-PATH LOGICAL DEVICE
508 TRANSMIT MESSAGE TO TARGET MPIO DRIVER INDICATING THAT CONTROL OF EXISTING MULTI-PATH LOGICAL DEVICE HAVING IS TO BE MIGRATED
510 OBTAIN LIST OF NATIVE IO PATHS FOR EXISTING MULTI-PATH LOGICAL DEVICE
512 DOES A CORRESPONDING MULTI-PATH LOGICAL DEVICE EXIST IN THE TARGET MPIO DRIVER FOR THE OBTAINED UNIQUE ID?
YES → 514 DELETE THE MULTI-PATH LOGICAL DEVICE IN THE TARGET MPIO DRIVER THAT CORRESPONDS TO THE UNIQUE ID
NO
516 CREATE AND CONFIGURE NEW IO STACK IN TARGET MPIO DRIVER FOR EXISTING MULTI-PATH LOGICAL DEVICE
518 CHANGE IO ENTRY POINTS OF EXISTING MULTI-PATH LOGICAL DEVICE TO TARGET MPIO DRIVER
520 MAP NATIVE IO PATHS OF EXISTING MULTI-PATH LOGICAL DEVICE
522 STORE MIGRATED MULTI-PATH LOGICAL DEVICE INFORMATION IN DATA REPOSITORY

(56) References Cited

U.S. PATENT DOCUMENTS

| | | | |
|---|---|---|---|
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,400,611 | B1 | 7/2016 | Raizen |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,639 | B2 | 12/2019 | Mallick et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1 | 8/2008 | Salli |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |

FOREIGN PATENT DOCUMENTS

| | | | |
|---|---|---|---|
| EP | 2667569 | A1 | 11/2013 |
| WO | PCT/US2019/052549 | | 12/2019 |
| WO | PCT/US2019/053204 | | 12/2019 |
| WO | PCT/US2019/053473 | | 12/2019 |

OTHER PUBLICATIONS

EMC, "EMC Powerpath Load Balancing and Failover", Comparison with native MPIO operating system solutions, Feb. 2011, 28 pages.

Dell EMC, "PowerMax Os," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, INC. "VMware VMFS Volume Management," 2009, 8 pages.

U.S. Appl. No. 16/142,274 filed in the name of Sanjib Mallick et al. on Sep. 26, 2018 and entitled "Host Device with Multi-Path Layer Implementing Automatic Standby Setting for Active-Active Configuration."

U.S. Appl. No. 16/145,502 filed in the name of Vinay G. Rao et al. on Sep. 28, 2018 and entitled "Host Device with Multi-Path Layer Implementing Path Selection Based At Least In Part on Fabric Identifiers."

U.S. Appl. No. 16/155,429 filed in the name of Rimpesh Patel et al. on Oct. 9, 2018 and entitled "Categorizing Host IO Load Pattern and Communicating Categorization to Storage System."

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

U.S. Appl. No. 15/849,828 filed in the name of Sanjib Mallick et al. on Dec. 21, 2017 and entitled "Storage System with Input-Output Performance Control Utilizing Application Process Detection."

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653 filed in the name of Maneesh Pusalkar et al. on Oct. 27, 2017 and entitled "Storage System with Network-Wide Configurable Device Names."

MIGRATING CONTROL OF A MULTI-PATH LOGICAL DEVICE FROM A CURRENT MPIO DRIVER TO A TARGET MPIO DRIVER

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the given host device to the storage system. In some cases, a user of the given host device may wish to update or replace the current MPIO driver on the given host device. For example, if a new version of a current MPIO driver has been released, the user of the given host device may wish to update the current MPIO driver to the new version. In another example, if the user of the given host device wishes to use a new or different MPIO driver, the user of the given host device may replace the current MPIO driver with the new or different MPIO driver. However, such an update or replacement of the current MPIO driver typically requires significant and substantial application downtime such as, e.g., outages, reconfiguration, or other similar downtime, as the update is performed.

SUMMARY

Illustrative embodiments of the present invention provide techniques for migrating control of multi-path logical devices from a current MPIO driver to a target MPIO driver without requiring significant application downtime. The migration illustratively comprises mapping IO entry points of the multi-path logical devices from the current MPIO driver to the target MPIO driver which allows the target MPIO driver to take advantage of the multi-path logical devices associated with the current MPIO driver for continuing IO operations without significant or substantial application downtime during the migration. These and other embodiments overcome the problems of significant or substantial application downtime that can otherwise result when MPIO driver software is replaced. For example, since the target MPIO driver seamlessly takes over control of the multi-path logical devices associated with the current MPIO driver, little or no application downtime is required to perform the migration of control from the current MPIO driver to the target MPIO driver and the host device may continue delivering IO operations to the storage system using the existing multi-path logical device during the migration.

In one embodiment, an apparatus comprises a host device configured to communicate over a network with a storage system. The host device includes a set of IO queues and a current MPIO driver configured to select IO operations from the set of IO queues for delivery to the storage system over the network. The current MPIO driver is further configured to group a plurality of paths from the host device to a logical unit number of the storage system into a multi-path logical device. The host device is further configured to install a target MPIO driver and to migrate control of the multi-path logical device to the target MPIO driver from the current MPIO driver where the migration comprises transferring IO entry points of the multi-path logical device from the current MPIO driver to the target MPIO driver. The host device is further configured to inhibit the current MPIO driver from using the multi-path logical device and to deliver IO operations selected by the target MPIO driver to the storage system using the multi-path logical device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
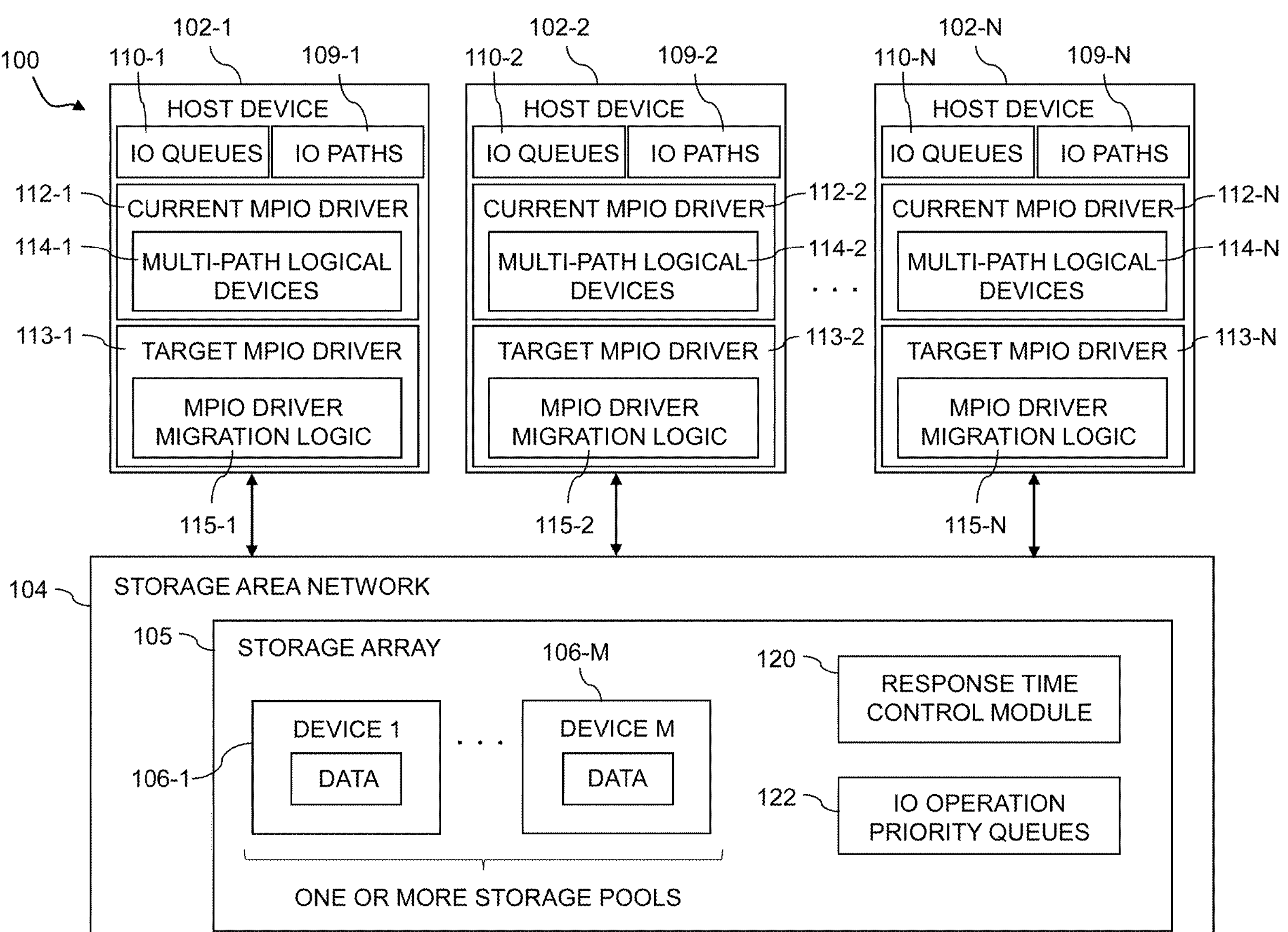
FIG. 1 is a block diagram of an information processing system configured with functionality for migrating control of existing multi-path logical devices from a current MPIO driver to a target MPIO driver without requiring application downtime in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO paths 109-1, 109-2, . . . , 109-N, respective sets of IO queues 110-1, 110-2, . . . 110-N, respective current MPIO drivers 112-1, 112-2, . . . 112-N, and respective target MPIO drivers 113-1, 113-2, . . . 113-N.

As used herein, IO paths 109-1 through 109-N, refer to information about or lists of the IO pathways between a given host device 102-1 through 102-N and one or more storage arrays 105. This information may include, for example, initiator-target pairs or other similar information that may define an IO pathway between the given host device 102 and the one or more storage arrays 105. This information may be used by an MPIO driver of the given host device to transmit data to or receive data from the one or more storage arrays 105 using the defined IO pathway.

While each host device 102 is illustrated as having a respective target MPIO driver 113, in some embodiments such target MPIO drivers 113 may be installed on one of host devices 102 or a subset of host devices 102. For example, target MPIO drivers 113 may be installed on host devices 102 for which a user wishes to migrate control of a multi-path logical device 114 associated with a current MPIO driver 112 to a target MPIO driver 113.

MPIO drivers typically group all IO paths 109 from a host to a logical unit number (LUN) into a single logical device known as a multi-path logical device 114. For example, current MPIO drivers 112-1, 112-2, . . . 112-N, may have respective multi-path logical devices 114-1, 114-2, . . . , 114-N that each group at least a portion of the IO paths 109 together for the respective host device 102-1, 102-2, . . . , 102-N. In some embodiments, each respective current MPIO driver 112-1, 112-2, . . . , 112-N may include multiple multi-path logical devices 114-1, 114-2, . . . , 114-N. The individual block devices representing each IO path 109 are known as native devices. Applications use a multi-path logical device 114 for IO operations so that the IO operations may be distributed across all available IO paths 109. When IO paths fail, the MPIO driver will typically redirect the IO operations to other alive IO paths in the multi-path logical device 114.

The MPIO drivers described herein may comprise, for example, otherwise conventional MPIO drivers, such as PowerPath drivers from Dell EMC, suitably modified in the manner disclosed herein to implement functionality for migrating control of multi-path logical devices from a current MPIO driver to a target MPIO driver without requiring significant application downtime. Other types of MPIO drivers from other driver vendors may be suitably modified to incorporate functionality for migrating control of multi-path logical devices as disclosed herein.

The multi-path layer comprising MPIO drivers supports multiple IO paths 109 between each of the host devices 102 and the storage array 105. These IO paths 109 are illustratively associated with respective initiator-target pairs, with each initiator comprising a host bus adaptor (HBA) or other initiating entity of a given host device such as the host device 102-1 and each target comprising a port or other targeted entity corresponding to one or more of the storage devices 106 of the storage array 105. As noted above, the storage devices 106 illustratively comprise LUNs or other types of logical storage devices.

IO paths 109 may be added or deleted between the host devices 102 and the storage array 105 in the system 100. For example, the addition of one or more new IO paths 109-1 from host device 102-1 to the storage array 105 or the deletion of one or more existing IO paths 109-1 from the host device 102-1 to the storage array 105 may result from respective addition or deletion of at least a portion of the storage devices 106 of the storage array 105.

Addition or deletion of IO paths can also occur as a result of zoning and masking changes or other types of storage system reconfigurations performed by a storage administrator or other user.

In some embodiments, IO paths are added or deleted in conjunction with the addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, IO path discovery scans may be performed by the MPIO drivers of the multi-path layer as needed in order to discover the addition of new IO paths or the deletion of existing IO paths.

A given IO path discovery scan can be performed utilizing known functionality of conventional MPIO drivers, such as PowerPath drivers.

The IO path discovery scan in some embodiments may be further configured to identify one or more new LUNs or other logical storage volumes associated with the one or more new IO paths identified in the path discovery scan. The IO path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new IO paths 109 identified in an IO path discovery scan of the type described above, the corresponding one of the host devices 102 is configured to execute a host registration operation for that IO path 109. The host registration operation for a given new IO path 109 illustratively provides notification to the storage array 105 that the corresponding one of the host devices 102 has discovered the new path.

The MPIO drivers utilize the multiple IO paths 109 described above to send IO operations from the host devices 102 to the storage array 105.

For example, a MPIO driver is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The current MPIO drivers 112 and target MPIO drivers 113 collectively comprise a multi-path layer of the host devices 102. The target MPIO drivers 113 provide functionality for migrating control of multi-path logical devices 114 from a current MPIO driver 112 to a target MPIO driver 113 without requiring significant application downtime, for example, using respective MPIO driver migration logic 115-1, 115-2, . . . 115-N implemented within the target MPIO drivers 113. In some embodiments, MPIO driver migration logic 115 may be implemented within host devices 102 separate from current MPIO drivers 112 and target MPIO drivers 113, e.g., stored in memory of the host device. In some embodiments, for example, host devices 102 may provide the functionality for migrating control of multi-path logical devices from a current MPIO driver to a target MPIO driver using MPIO driver migration logic 115 without relying on target MPIO drivers 113 to provide the functionality. While implementation of the MPIO driver migration logic 115 is described with respect to target MPIO driver 113 herein, in some embodiments, host device 102 may also or alternatively separately implement some or all of the MPIO driver migration logic 115.

Since applications continuously use the multi-path logical devices 114 for IO operations, it may become challenging to remove/replace a current MPIO driver 112 without disrupting IO operations or without causing substantial or significant application downtime in the applications using the host device 102 where the removal is being performed. In existing systems, since the multi-path logical device 114 is an entity created by the current MPIO driver 112, the current MPIO driver 112 cannot be replaced without first uninstalling and removing the corresponding multi-path logical devices 114.

A user may wish to modify or replace a current MPIO driver 112 for many reasons including, for example, better IO throughput, additional features, or other similar reasons. Since the multi-path logical devices 114 created by the current MPIO driver 112 are tightly coupled to the current MPIO driver 112 in existing systems, users are not able to modify or replace the current MPIO driver 112 without incurring significant and substantial application downtime.

MPIO driver migration logic 115 is configured to migrate control of multipath logical devices 114 in host device 102 from using a current MPIO driver 112 to select and deliver IO operations to a storage array 105 to using a target MPIO driver 113 to select and deliver the IO operations. This migration is performed without incurring significant or substantial downtime, and in some embodiments without incurring any downtime, of an application running on the host device 102 that is performing the migration. For example, MPIO driver migration logic 115 is configured to perform the migration by transferring control of multi-path logical devices 114 from a current MPIO driver 112 to a target MPIO driver 113.

Unlike the above described existing systems, where switching to a target MPIO driver 113 requires uninstalling the multi-path logical devices 114 created by a current MPIO driver 112 and generating or creating new multi-path logical devices by the target MPIO driver, MPIO driver migration logic 115 instead re-uses the multi-path logical devices 114 that have already been generated or created by the current MPIO driver 112. Under the MPIO driver migration logic 115, the target MPIO driver 113 recognizes the multi-path logical devices 114 created by the current MPIO driver 112 and takes control of them instead of creating its own new multi-path logical devices. This seamless migration allows the target MPIO driver 113 to preserve the IO operation flow of the applications running on the host device for which the migration is being performed.

Illustrative embodiments of the techniques and functionality of MPIO driver migration logic 115 will now be described in more detail with reference to FIG. 2.

Figure 2:
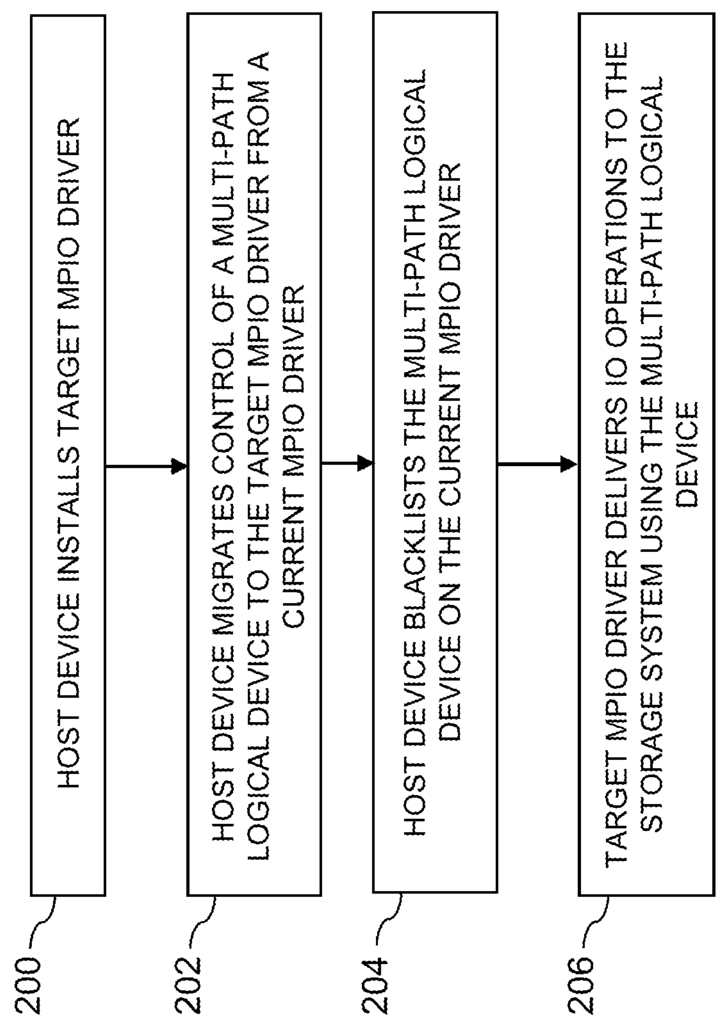
FIG. 2 is a flow diagram of a process for migrating control of existing multi-path logical devices from a current MPIO driver to a target MPIO driver without requiring application downtime in an illustrative embodiment.

The process as shown in FIG. 2 includes steps 200 through 206, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes.

At 200, the host device 102 may install the target MPIO driver 113. In some embodiments, target MPIO driver 113 may already be installed on host device 102. For example, target MPIO driver 113 may already be active on the host device 102 and may be selecting IO operations from the IO queues 110 for delivery to the SAN 104, e.g., using its own multi-path logical devices. In some embodiments, MPIO driver migration logic 115 may determine whether both the current MPIO driver 112 and target MPIO driver 113 are present on a host device 102. For example, if the target MPIO driver 113 has not been installed on the host device 102 or the current MPIO driver 112 is not present, MPIO driver migration logic 115 may abort since no migration of control of the multi-path logical devices 114 may occur.

In some embodiments, in conjunction with or during the installation of target MPIO driver 113, where target MPIO driver 113 may normally create new multi-path logical devices, target MPIO driver 113 may alternatively not create new multi-path logical devices if a current MPIO driver 112 already includes corresponding multi-path logical devices 114 that may be migrated to control of the target MPIO driver 113.

At 202, MPIO driver migration logic 115 migrates the control of a multi-path logical device 114 to the target MPIO driver 113 from the current MPIO driver 112.

For example, in some embodiments, MPIO driver migration logic 115 may obtain or create a data structure such as, e.g., an array, list, or other data structure, that contains information about each multi-path logical device 114 for which control is to be migrated to the target MPIO driver 113. The data structure may contain information about the native paths that are included in each of the multi-path logical devices 114. For example, a user may specify which multi-path logical devices 114 will be included in the data structure for migration. In some embodiments, a user may specify that the control of all multi-path logical devices 114 under control of a current MPIO driver 112 will be migrated and each multi-path logical device 114 under control of the current MPIO driver 112 may be added to or included in the data structure.

Each multi-path logical device entry in the data structure may comprise information that identifies the multi-path logical device 114. For example, an entry in the data structure may comprise a device major number, a device minor number, a device unique identifier, a combination thereof, or any other information that identifies a given multi-path logical device 114. In some embodiments, the information contained in the entry of the data structure may uniquely identify the given multi-path logical device 114. As an example, the device unique identifier may comprise a Network Addressing Authority identifier (NAA ID) such as, e.g., a NAA 6 ID. In some embodiments, the data structure may be stored in a database or a persistent file. An entry in the data structure for a multi-path logical device 114 may comprise, for example, a structure similar to following pseudocode:

```
Struct_dev_transitioned {
   Char * device_name;
   Char unique-ID[100];
   ..
};
```

In some embodiments, an IO control message (IOCTL) may be sent to the target MPIO driver 113 that indicates to the target MPIO driver 113 that migration of control of a given multi-path logical device 114 from the current MPIO driver 112 to the target MPIO driver 113 needs to be performed. In some embodiments, the message may provide or contain information about the given multi-path logical device 114 to be migrated such as, e.g., some or all of the information stored in the entry in the data structure for the given multi-path logical device 114. In some embodiments, the message may simply indicate which multi-path logical device 114 needs to be migrated and target MPIO driver 113 may retrieve the information from the data structure.

As part of the migration process, MPIO driver migration logic 115 may scan the IO paths 109 for each multi-path logical device 114 using the unique ID corresponding to that multi-path logical device 114 as found in the data structure and a map of the corresponding IO paths 109 may be generated.

An IO stack may be created in the target MPIO driver 113 for each multi-path logical device 114 found in the data structure, e.g., each multi-path logical devices 114 for which control will be migrated to the target MPIO driver 113.

As part of the migration process, a given multi-path logical device 114 may be partially frozen or suspended from acting on incoming IO operations in a manner that stages any new incoming IO operations in a queue such as, e.g., IO queues 110. For example, a lock on a data structure of the given multi-path logical device 114 associated with the processing of IO operations may be held temporarily to force incoming IO operations onto the queue. In some embodiments, a request queue spin lock may be held, for example, on a Linux system.

While the lock is held, any outstanding IO operations of the given multi-path logical device 114 will continue to be processed as normal until completion while any new IO operations will be added to the queue.

In some embodiments, the process of issuing the IO operations may be put to sleep such that putting IO operations in the queue does not exhaust the resources of the host device 102.

In conjunction with the lock and the processing of outstanding IO operations, the IO entry points of the given multi-path logical device 114 may be changed to the target MPIO driver 113 entry and strategy functions. For example, the IO entry points may be mapped to the target MPIO driver 113, a link may be established from the target MPIO driver 113 to the IO entry points, or other similar changes may be made to the IO entry points of the given multi-path logical device 114. This process may be performed for each of the multi-path logical devices 114 for which control is to be migrated to the target MPIO driver 113.

At 204, the host device blacklists the multi-path logical devices 114 that have been migrated to control of the target MPIO driver 113 in the current MPIO driver 112 to ensure that the current MPIO driver 112 is inhibited from using the migrated multi-path logical devices 114 for further IO processing. For example, the migrated multi-path logical devices 114 may be added to a list of devices that the current MPIO driver 112 is not authorized to use. In some embodiments, the current MPIO driver 112 may alternatively include a whitelist (e.g., approved or authorized devices) and the multi-path logical devices 114 that have been migrated may be removed from the whitelist to inhibit use by the current MPIO driver 112. In some embodiments, if all multi-path logical devices 114 that were under control of the current MPIO driver 112 have been migrated to control of the target MPIO driver 113 (or to control of another driver), the current MPIO driver 112 may be uninstalled from the system. For example, if there are no IO entry points associated with the current MPIO driver 112, no more IO operations will be passed through the current MPIO driver 112, and the current MPIO driver 112 may be uninstalled.

At 206, the target MPIO driver 113 resumes IO operations for the multi-path logical devices 114 for which control has been migrated, for example, by releasing the locks on those multi-path logical devices 114, and delivering IO operations to the storage array 105 using the multi-path logical devices 114 that have been migrated to control of the target MPIO driver 113.

In some embodiments, for example, in a clustered environment where Small Computer System Interface Persistent Reservation (SCSI PR) keys are used by a host device to provide protection to a multi-path logical device 114, it is the duty of the target MPIO drivers 113 to manage and apply the keys on all IO paths 109 belonging to same multi-path logical device 114. In conjunction with a reboot of the host device, MPIO drivers, a storage array or other portion of the system, for example, additional processes may be performed due to the migration of one or more multi-path logical devices 114 to control of the target MPIO driver 113.

For example, when the target MPIO driver 113 is restarting in conjunction with the system boot, it typically will create its own corresponding multi-path logical devices. While creating the multi-path logical devices, the target MPIO driver 113 may check if control of a given multi-path logical device that is being created was previously migrated from the current MPIO driver 112.

As an example, the target MPIO driver 113 may compare the unique ID of the multi-path logical device being created in conjunction with the system boot with the unique ID associated with the multi-path logical device entries in the data structure. If the unique ID of the multi-path logical device being created matches the unique ID associated with one of the multi-path logical device entries in the data structure, the target MPIO driver 113 may continue creating the multi-path logical device as usual and may further create a soft link to the matching multi-path logical device 114 in a directory that was used by the current MPIO driver 112 to communicate with the multi-path logical device 114.

In this manner, the host device 102 does not require a reconfiguration to use the new multi-path logical devices created by target MPIO driver 113 in conjunction with a system boot.

Separate instances of the FIG. 2 process may be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and MPIO driver migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different MPIO driver migration logic arrangements within a given information processing system.

Functionality such as that described in conjunction with the flow diagram of FIG. 2 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

Numerous alternative arrangements of these and other features can be used in implementing the FIG. 2 process and other illustrative embodiments.

The illustrative embodiments disclosed herein can provide a number of significant advantages relative to conventional arrangements. For example, some embodiments configure a multi-path layer of one or more host devices to include functionality for migrating control of multi-path logical devices from a current MPIO driver to a target MPIO driver without requiring significant application downtime in an associated storage array or other type of storage system. The multi-path layer in such arrangements can be configured to migrate control of multi-path logic devices from current MPIO drivers to target MPIO drivers.

Figure 3:
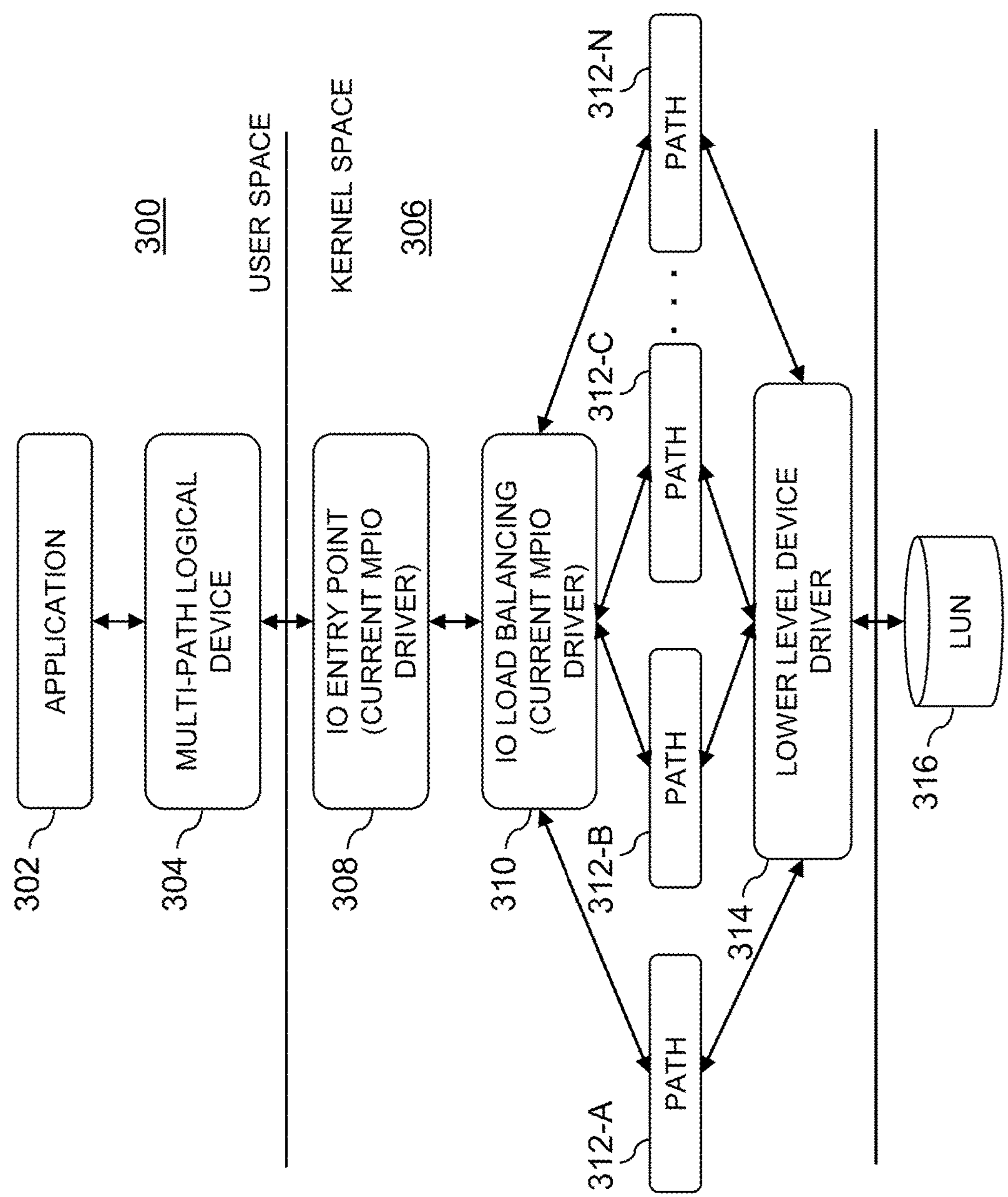
FIG. 3 is a diagram illustrating the interaction path between a host device and a storage array using a multi-path logical device controlled by a current MPIO driver in an illustrative embodiment.

With reference now to FIGS. 1 and 3, the diagram of FIG. 3 illustrating the interaction path between the host device 102 and storage array 105 using a multi-path logical device 114 controlled by current MPIO driver 112 will now be described.

For example, in a user space 300, an application 302 resident on host device 102 submits IO operations for processing. Current MPIO driver 112 may select the IO operations for delivery via a multi-path logical device 304, establishing communication between application 302 and multi-path logical device 304.

In kernel space 306, an IO entry point 308 of the multi-path logical device 304 that is controlled by the current MPIO driver 112 is configured to receive the selected IO operations and submit the selected IO operations to an IO load balancing component 310 of the current MPIO driver 112. The IO load balancing component 310 performs load balancing, for example, by assigning the IO operations to different paths 312-A, 312-B, 312-C, . . . , 312-N of the multi-path logic device 304. For example, if m IO operations are selected, they may be separated out to the paths where, e.g., path 312-A receives one or more IO operations, path 312-B receives one or more IO operations, path 312-C receives one or more IO operations, . . . , and path 312-N receives one or more IO operations. In some embodiments, a given path may receive no IO operations, all m IO operations, or any portion of the m IO operations. The number of IO operations assigned to each path may be determined, for example, based on the current load on each path, or in any other manner commonly used by MPIO drivers during load balancing.

A lower level device driver 314 is configured to receive the IO operations from the paths 312, and to transfer the IO operations to a target LUN 316 of storage array 105.

Figure 4:
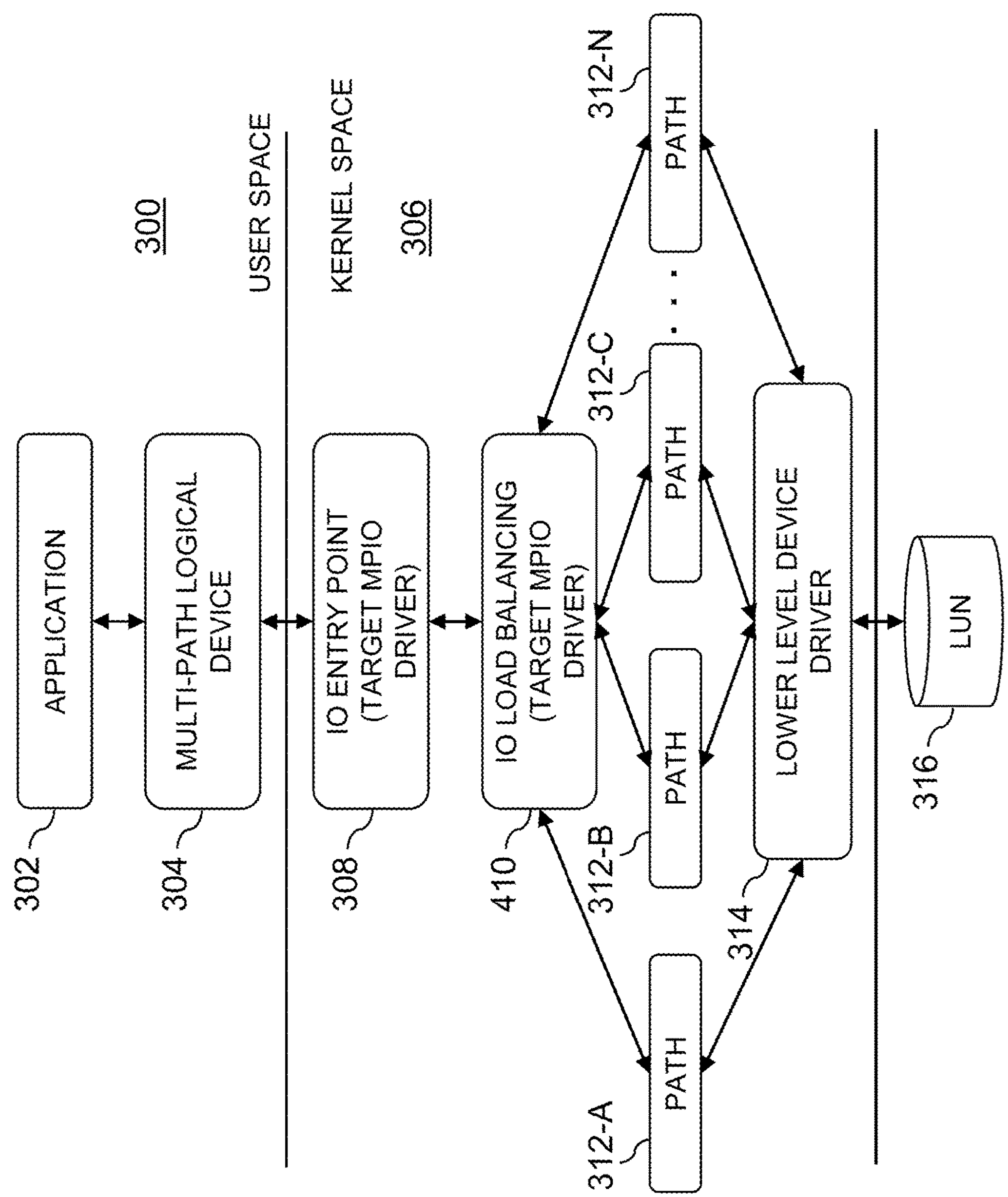
FIG. 4 is a diagram illustrating the interaction path between the host device and the storage array of FIG. 3 using the multi-path logical device after control has been migrated to a target MPIO driver in an illustrative embodiment.

With reference now to FIGS. 1 and 4, the diagram of FIG. 4 illustrating the interaction path between the host device 102 and storage array 105, using the same multi-path logical device as described with reference to FIG. 3 after control has been migrated to target MPIO driver 113, will now be described.

For example, in user space 300, the application 302 resident on host device 102 submits IO operations for processing. Target MPIO driver 113 may select the IO operations for delivery via the same multi-path logical device 304 as found in FIG. 3, establishing communication between application 302 and multi-path logical device 304.

In kernel space 306, the IO entry point 308 of the multi-path logical device 304 is now controlled by the target MPIO driver 113 after migration and is configured to receive the selected IO operations and submit the selected IO operations to an IO load balancing component 410 of the target MPIO driver 113, instead of the IO load balancing component 310. The IO load balancing component 410 performs load balancing, for example, by assigning the IO operations to the different paths 312-A, 312-B, 312-C, . . . , 312-N of the multi-path logic device 304, as described above. Since the target MPIO driver 113 is now controlling the multi-path logic device 304, the load balancing between the paths 312 may be different than that performed by current MPIO driver 112.

The lower level device driver 314 is configured to receive the IO operations from the paths 312, and to transfer the IO operations to a target LUN 316 of storage array 105.

As seen from FIGS. 3 and 4, the migration of control of the multi-path logical device 304 from control of the current MPIO driver 112 to the target MPIO driver 113 may be performed seamlessly without incurring significant or substantial interruptions to the flow of the IO operations from the application 302 of the host device 102 to the storage array 105.

Additional illustrative embodiments of the techniques and functionality of MPIO driver migration logic 115 will now be described in more detail with reference to FIG. 5.

Figure 5:
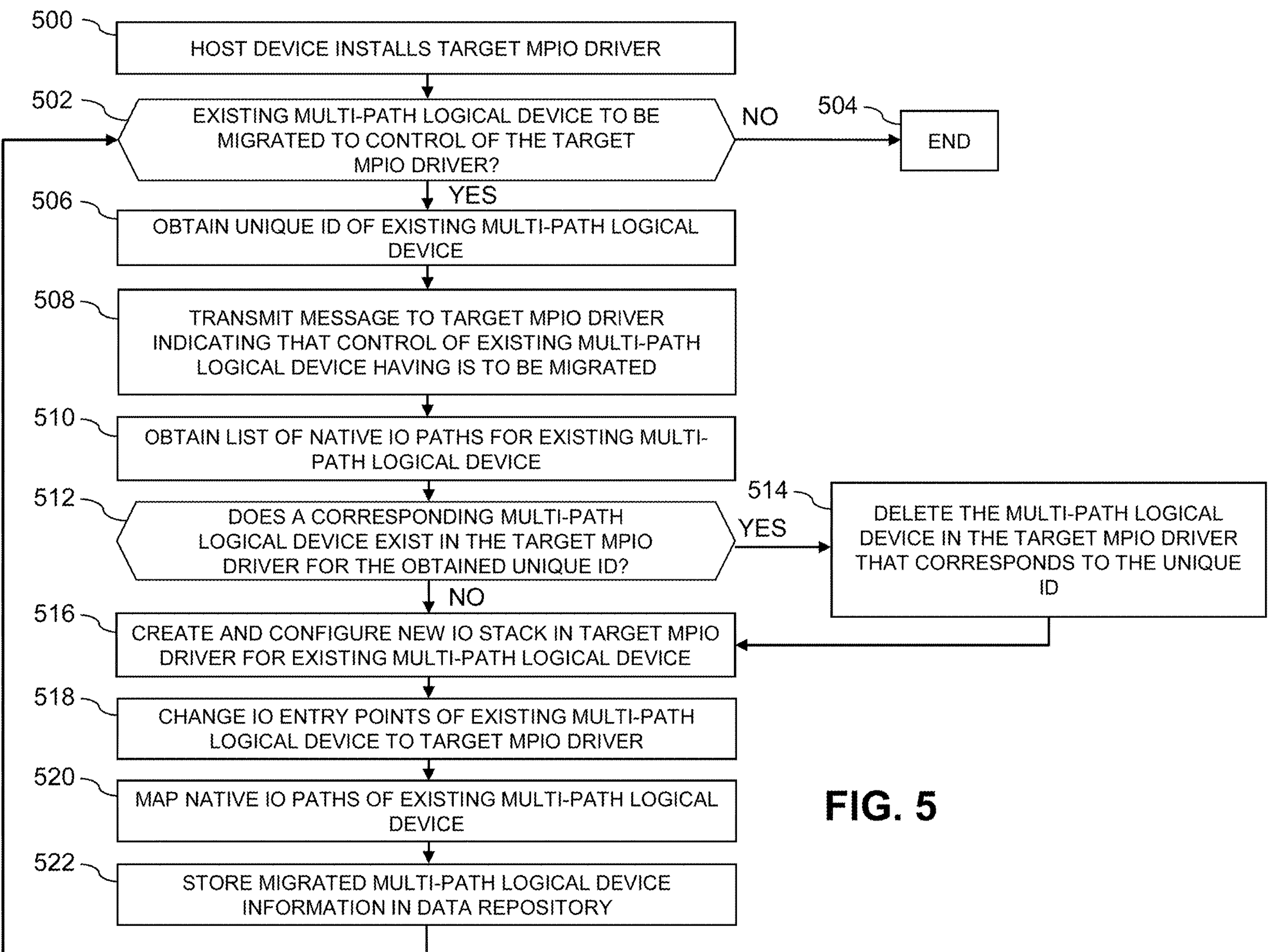
FIG. 5 is a flow diagram of a process for migrating control of existing multi-path logical devices from a current MPIO driver to a target MPIO driver without requiring application downtime in another illustrative embodiment.

The process as shown in FIG. 5 includes steps 500 through 522, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes.

At 500, the host device 102 may install the target MPIO driver 113, for example, as described above with reference to FIG. 2.

At 502, MPIO driver migration logic 115 determines whether there are any existing multi-path logical devices 114 that need to be migrated to control of target MPIO driver 113. If no existing multi-path logical devices 114 remain to be migrated, the method may end at 504.

At 506, if an existing multi-path logical device 114 remains to be migrated, MPIO driver migration logic 115 may obtain a unique ID for the existing multi-path logical device 114. For example, MPIO driver migration logic 115 may obtain or create the data structure that contains entries including information about each multi-path logical device 114 for which control is to be migrated to the target MPIO driver 113 as described above with reference to FIG. 2. This information may include, for example, a unique ID corresponding to the existing multi-path logical device 114.

At 508, an IOCTL message may be sent to the target MPIO driver 113 that indicates to the target MPIO driver 113 that migration of control of a given multi-path logical device 114 from the current MPIO driver 112 to the target MPIO driver 113 needs to be performed, for example, as described above with reference to FIG. 2.

At 510, MPIO driver migration logic 115 may obtain a list of the native IO paths of the existing multi-path logical device 114.

At 512, MPIO driver migration logic 115 may determine whether a corresponding multi-path logical device exists in the target MPIO driver 113 for the obtained unique ID.

At 514, if a corresponding multi-path logical device exists in the target MPIO driver 113 for the obtained unique ID, the corresponding multi-path logical device is deleted or otherwise removed from the target MPIO driver 113 by MPIO driver migration logic 115. In some embodiments, the IO stack associated with the corresponding multi-path logical device may also be deleted or otherwise destroyed or removed from the target MPIO driver 113 by MPIO driver migration logic 115.

At 516, if no corresponding multi-path logical device exists in the target MPIO driver 113 for the obtained unique ID (NO for step 512) or a corresponding multi-path logical device existed in the target MPIO driver 113 but has been deleted or otherwise removed (Step 514), a new IO stack for the existing multi-path logical device 114 is created in the target MPIO driver 113 by MPIO driver migration logic 115.

At 518, MPIO driver migration logic 115 changes the IO entry points of the existing multi-path logical device 114 to the target MPIO driver 113, for example, as described above with reference to FIG. 2.

At 520, MPIO driver migration logic 115 creates a map of the native IO paths of the existing multi-path logical device 114 in the target MPIO driver 113.

At 522, MPIO driver migration logic 115 stores information about the migrated multi-path logical device 114 in a data repository, for example, a data repository associated with host device 102. The method then returns to 502 to determine whether there are any more existing multi-path logical devices 114 for which control needs to be migrated to the target MPIO driver 113. The target MPIO driver 113 may also resume IO operations for any migrated multi-path logical devices 114 for which control has been migrated as described above.

Separate instances of the FIG. 5 process may be performed in respective additional host devices that share the storage array.

The particular processing operations and other system functionality described in conjunction with the flow diagram of FIG. 5 are presented by way of illustrative example only, and should not be construed as limiting the scope of the disclosure in any way. Alternative embodiments can use other types of processing operations involving host devices, storage systems and MPIO driver migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different MPIO driver migration logic arrangements within a given information processing system.

Functionality such as that described in conjunction with the flow diagram of FIG. 5 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for migrating control of multi-path logical devices from a current MPIO driver to a target MPIO driver without requiring significant application downtime are carried out at least in part under the control of its MPIO driver migration logic 115. For example, MPIO driver migration logic 115 is illustratively configured to control performance of portions of the process shown in the flow diagrams described above in conjunction with FIGS. 2 and 5, and the diagrams of FIGS. 3 and 4.

It is assumed that each of the other MPIO drivers 112 and 113 are configured in a manner similar to that described above and elsewhere herein for the first current MPIO driver 112-1 and first target MPIO driver 113-1. The other host devices 102 of the system 100 are therefore also configured to communicate over the SAN 104 with the storage array 105 and the MPIO drivers 112 and 113 of such other host devices are each similarly configured to select IO operations from its corresponding one of the sets of IO queues 110 for delivery to the storage array 105 over the SAN 104, and to perform the disclosed functionality for migrating control of multi-path logical devices 114 from a current MPIO driver 112 to a target MPIO 113 driver without requiring significant application downtime. Accordingly, functionality described above in the context of the first MPIO drivers 112-1 and 113-1 is assumed to be similarly performed by each of the other MPIO drivers 112-2 and 113-2 through 112-N and 113-N for migrating control of respective multi-path logical devices 114-1 through 114-N.

The MPIO drivers 112 and 113 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support migration of the control of multi-path logical devices 114 from a current MPIO driver 112 to a target MPIO 113 driver without requiring significant application downtime.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for migrating control of multi-path logical devices as disclosed herein, many storage systems will require substantial or significant application downtime to update, upgrade, or otherwise change their MPIO drivers. This leads to inefficiencies in the storage system as well as in the host devices that share that storage system.

Such drawbacks are advantageously overcome in illustrative embodiments herein by utilization of MPIO driver migration logic 115 to implement functionality for migrating control of multi-path logical devices 114 from a current MPIO driver 112 to a target MPIO 113 driver without requiring significant application downtime as described above.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support migration of the control of multi-path logical devices from a current MPIO driver to a target MPIO driver without requiring significant application downtime as disclosed herein.

For example, the storage array 105 may comprise one or more storage arrays such as VNX®, Symmetrix VIVIAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and MPIO driver migration logic 115 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the MPIO driver migration logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, MPIO driver migration logic and additional or alternative components. Also, the particular configurations of system and device elements and associated processing operations illustratively shown in the drawings can be varied in other embodiments. For example, a wide variety of different MPIO driver configurations and associated MPIO driver migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:

a host device configured to communicate over a network with a storage system;

the host device comprising:

a set of input-output queues;

a current multi-path input-output driver configured to select input-output operations from the set of input-output queues for delivery to the storage system over the network, the current multi-path input-output driver configured to group a plurality of paths from the host device to a logical unit number of the storage system into a multi-path logical device;

wherein the host device is further configured:

to install a target multi-path input-output driver;

to migrate control of the multi-path logical device to the target multi-path input-output driver from the current multi-path input-output driver, the migration comprising transferring input-output entry points of the multi-path logical device from the current multi-path input-output driver to the target multi-path input-output driver;

to inhibit the current multi-path input-output driver from using the multi-path logical device; and to deliver input-output operations selected by the target multi-path input-output driver to the storage system using the multi-path logical device.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein migrating control of the multi-path logical device to the target multi-path input-output driver comprises generating an input-output stack for the multi-path logical device.

4. The apparatus of claim 3 wherein the host device is further configured:

to stage incoming input-output operations for the multi-path logical device in the set of input-output queues;

to execute outstanding input-output operations of the multi-path logical device until no outstanding input-output operations remain for the multi-path logical device; and in response to completion of the execution of the outstanding input-output operations and migration of control of the multi-path logical device to the target multi-path input-output driver, resume input-output operations on the multi-path logical device from the set of input-output queues under control of the target multi-path input-output driver.

5. The apparatus of claim 4 wherein staging the incoming input-output operations for the multi-path logical device in the set of input-output queues comprises holding a lock on a data structure of the multi-path logical device, and wherein resuming input-output operations on the multi-path logical device comprises releasing the lock.

6. The apparatus of claim 1 wherein the host device is further configured to obtain information characterizing one or more multi-path logical devices for which control is to be migrated to the target multi-path input-output driver, the information comprising a unique identifier for each multi-path logical device for which control is to be migrated to the target multi-path input-output driver.

7. The apparatus of claim 6 wherein the host device is further configured to identify at least one native path associated with a given one of the unique identifiers and generate a mapping of the at least one native path to the multi-path logical device corresponding to the given one of the unique identifiers.

8. The apparatus of claim 1 wherein the host device is further configured:

to migrate control of all of the multi-path logical devices that are under control of the current multi-path input-output driver to control of the target multi-path input-output driver; and in response to completion of the migration of control of all of the multi-path logical devices that are under control of the current multi-path input-output driver to the target multi-path input-output driver, to uninstall the current multi-path input-output driver.

9. The apparatus of claim 1 wherein in conjunction with a reboot after migration of control of the multi-path logical device to the target multi-path input-output driver, the target multi-path input-output driver is configured:

to generate a plurality of multi-path logical devices;

to determine whether or not a given one of the generated multi-path logical devices corresponds to the multi-path logical device for which control was migrated to the target multi-path input-output driver;

in response to determining that the given one of the generated multi-path logical devices corresponds to the multi-path logical device for which control was migrated to the target multi-path input-output driver, to generate a link from the given one of the generated multi-path logical devices to the multi-path logical device for which control was migrated to the target multi-path input-output driver, the link allowing the target multi-path input-output driver to utilize the multi-path logical device for which control was migrated to the target multi-path input-output driver via the given one of the generated multi-path logical devices.

10. The apparatus of claim 9 wherein determining whether or not the given one of the generated multi-path logical devices corresponds to the multi-path logical device for which control was migrated to the target multi-path input-output driver comprises comparing an identifier corresponding to the given one of the generated multi-path logical devices to an identifier corresponding to the multi-path logical device for which control was migrated to the target multi-path input-output driver.

11. A method comprising:

configuring a current multi-path input-output driver of a host device to select input-output operations from a set of input-output queues of the host device for delivery to a storage system over a network, the current multi-path input-output driver configured to group a plurality of paths from the host device to a logical unit number of the storage system into a multi-path logical device;

wherein the host device performs the following steps:

installing a target multi-path input-output driver;

migrating control of the multi-path logical device to the target multi-path input-output driver from the current multi-path input-output driver, the migration comprising transferring input-output entry points of the multi-path logical device from the current multi-path input-output driver to the target multi-path input-output driver;

inhibiting the current multi-path input-output driver from using the multi-path logical device; and delivering input-output operations selected by the target multi-path input-output driver to the storage system using the multi-path logical device.

12. The method of claim 11 wherein migrating control of the multi-path logical device to the target multi-path input-output driver comprises generating an input-output stack for the multi-path logical device.

13. The method of claim 12 wherein the method further comprises:

staging incoming input-output operations for the multi-path logical device in the set of input-output queues;

executing outstanding input-output operations of the multi-path logical device until no outstanding input-output operations remain for the multi-path logical device; and in response to completion of the execution of the outstanding input-output operations and migration of control of the multi-path logical device to the target multi-path input-output driver, resuming input-output operations on the multi-path logical device from the set of input-output queues under control of the target multi-path input-output driver.

14. The method of claim 13 wherein staging the incoming input-output operations for the multi-path logical device in the set of input-output queues comprises holding a lock on a data structure of the multi-path logical device, and wherein resuming input-output operations on the multi-path logical device comprises releasing the lock.

15. The method of claim 11 wherein the method further comprises obtaining information characterizing one or more multi-path logical devices for which control is to be migrated to the target multi-path input-output driver, the information comprising a unique identifier for each multi-path logical device for which control is to be migrated to the target multi-path input-output driver.

16. The method of claim 15 wherein the method further comprises identifying at least one native path associated with a given one of the unique identifiers and generate a mapping of the at least one native path to the multi-path logical device corresponding to the given one of the unique identifiers.

17. The method of claim 11 wherein the method further comprises:

migrating control of all of the multi-path logical devices that are under control of the current multi-path input-output driver to control of the target multi-path input-output driver; and in response to completion of the migration of control of all of the multi-path logical devices that are under control of the current multi-path input-output driver to the target multi-path input-output driver, uninstalling the current multi-path input-output driver.

18. The method of claim 11 wherein in conjunction with a reboot after migration of control of the multi-path logical device, the method further comprises:

generating a plurality of multi-path logical devices;

determining whether or not a given one of the generated multi-path logical devices corresponds to the multi-path logical device for which control was migrated to the target multi-path input-output driver;

in response to determining that the given one of the generated multi-path logical devices corresponds to the multi-path logical device for which control was migrated to the target multi-path input-output driver, generating a link from the given one of the generated multi-path logical devices to the multi-path logical device for which control was migrated to the target multi-path input-output driver, the link allowing the target multi-path input-output driver to utilize the multi-path logical device for which control was migrated to the target multi-path input-output driver via the given one of the generated multi-path logical devices.

19. The method of claim 18 wherein determining whether or not the given one of the generated multi-path logical devices corresponds to the multi-path logical device for which control was migrated to the target multi-path input-output driver comprises comparing an identifier corresponding to the given one of the generated multi-path logical devices to an identifier corresponding to the multi-path logical device for which control was migrated to the target multi-path input-output driver.

20. A computer program product comprising a non-transitory processor-readable storage medium having stored therein program code of one or more software programs, wherein the program code, when executed by a host device comprising a current multi-path input-output driver and a set of input-output queues, the host device being configured to communicate over a network with a storage system, the current multi-path input-output driver configured to select input-output operations from the set of input-output queues for delivery to the storage system over the network, the current multi-path input-output driver configured to group a plurality of paths from the host device to a logical unit number of the storage system into a multi-path logical device, causes the host device:

to install a target multi-path input-output driver;

to migrate control of the multi-path logical device to the target multi-path input-output driver from the current multi-path input-output driver, the migration comprising transferring input-output entry points of the multi-path logical device from the current multi-path input-output driver to the target multi-path input-output driver;

to inhibit the current multi-path input-output driver from using the multi-path logical device; and to deliver input-output operations selected by the target multi-path input-output driver to the storage system using the multi-path logical device.

* * * * *